US012019049B2

(12) United States Patent
Takagi et al.

(10) Patent No.: US 12,019,049 B2
(45) Date of Patent: Jun. 25, 2024

(54) BONDING LAYER EVALUATION SYSTEM AND BONDING LAYER EVALUATION METHOD

(71) Applicants: MITSUBISHI HEAVY INDUSTRIES, LTD., Tokyo (JP); KYOTO UNIVERSITY, Kyoto (JP); THE RITSUMEIKAN TRUST, Kyoto (JP)

(72) Inventors: Kiyoka Takagi, Tokyo (JP); Sota Kamo, Tokyo (JP); Naoki Matsuda, Kyoto (JP); Naoki Mori, Shiga (JP)

(73) Assignees: MITSUBISHI HEAVY INDUSTRIES, LTD., Tokyo (JP); KYOTO UNIVERSITY, Kyoto (JP); THE RITSUMEIKAN TRUST, Kyoto (JP)

( * ) Notice: Subject to any disclaimer, the term of this patent is extended or adjusted under 35 U.S.C. 154(b) by 567 days.

(21) Appl. No.: 17/415,897

(22) PCT Filed: Dec. 20, 2019

(86) PCT No.: PCT/JP2019/050211
§ 371 (c)(1),
(2) Date: Jun. 18, 2021

(87) PCT Pub. No.: WO2020/130150
PCT Pub. Date: Jun. 25, 2020

(65) Prior Publication Data
US 2022/0074895 A1 Mar. 10, 2022

(30) Foreign Application Priority Data
Dec. 21, 2018 (JP) .................. 2018-240058

(51) Int. Cl.
*G01N 29/12* (2006.01)
*G01N 29/46* (2006.01)

(52) U.S. Cl.
CPC ............. *G01N 29/12* (2013.01); *G01N 29/46* (2013.01); *G01N 2291/028* (2013.01); *G01N 2291/042* (2013.01); *G01N 2291/102* (2013.01)

(58) Field of Classification Search
None
See application file for complete search history.

(56) References Cited

U.S. PATENT DOCUMENTS 5,305,239 A 4/1994 Kinra
11,047,829 B2 6/2021 Ducousso et al.

FOREIGN PATENT DOCUMENTS

| JP | S56164953 A | 12/1981 |
| JP | 2015125008 A | 7/2015 |
| WO | 2018078272 A1 | 5/2018 |

OTHER PUBLICATIONS

International Search Report and Written Opinion of International Application No. PCT/JP2019/050211 dated Mar. 17, 2020; 13pp.
(Continued)

*Primary Examiner* — Roy Y Yi
(74) *Attorney, Agent, or Firm* — HAUPTMAN HAM, LLP

(57) ABSTRACT

A bonding layer evaluation system includes an elastic wave generation device configured to generate an elastic wave from a sample including a bonding layer; an elastic wave reflection body configured to reflect the elastic wave generated from the sample; a sample installation unit provided between the elastic wave generation device and the elastic wave reflection body; an elastic wave detection device disposed in a direction in which the elastic wave is reflected by the elastic wave reflection body, and configured to detect the reflected elastic wave; and a control device configured to evaluate a parameter related to the bonding layer. The control device evaluates the parameter related to the bonding
(Continued)

layer by comparing the actual value of the elastic wave detected by the elastic wave detection device with a theoretical value of the elastic wave calculated based on a theoretical model related to the sample.

5 Claims, 7 Drawing Sheets

(56) References Cited

OTHER PUBLICATIONS

Yosuke Ishii "Study on characteristics evaluation of the interlaminar interface of carbon fiber reinforced plastic laminated plate using ultrasonic spectroscopy" pp. 7-12, 81-119, fig. 1.4, 4.2, 5.17, 5.19, 5.20, 5.21, non-official translation; URL: https://repository.kulib.kyoto-u.ac.jp/dspace/bitstream/2433/215514/2/dkogk04143.pdf; Mar. 23, 2016.

BONDING LAYER EVALUATION SYSTEM AND BONDING LAYER EVALUATION METHOD

RELATED APPLICATIONS

The present application is a National Phase of International Application Number PCT/JP2019/050211 filed Dec. 20, 2019 and claims priority to Japanese Application Number 2018-240058 filed Dec. 21, 2018.

FIELD

The present invention relates to a bonding layer evaluation system and a bonding layer evaluation method.

BACKGROUND

A technology of emitting an ultrasonic wave to a sample including a bonding layer, detecting a reflected wave of the emitted ultrasonic wave, which is reflected at the bonding layer, and detecting a bonding defect at the bonding layer based on a temporal waveform of the detected reflected wave has been known (refer to Patent Literature 1).

CITATION LIST

Patent Literature

Patent Literature 1: Japanese Patent Application Laid-open No. 2015-125008

SUMMARY

Technical Problem

The technology of Patent Literature 1 has a problem in that, without breaking the sample, a bonding defect at the bonding layer, in other words, a void space between two sample pieces sandwiching the bonding layer in the sample can be detected, but a weak bond having no void space between two test pieces but having weak bond strength therebetween cannot be detected. In addition, any conventional technology of detecting a weak bond involves breaking of a sample and thus has a problem in that a weak bond cannot be detected without breaking the sample.

The present invention has been made in view of the foregoing, and an object of the present invention is to provide a bonding layer evaluation system and a bonding layer evaluation method that are capable of evaluating a bonding layer without breaking a sample.

Solution to Problem

In order to solve the problems described above and achieve the object, a bonding layer evaluation system includes an elastic wave generation device configured to generate an elastic wave from a sample including a bonding layer; an elastic wave reflection body configured to reflect the elastic wave generated from the sample; a sample installation unit provided between the elastic wave generation device and the elastic wave reflection body; an elastic wave detection device disposed in a direction in which the elastic wave is reflected by the elastic wave reflection body, the elastic wave detection device being configured to detect the reflected elastic wave; and a control device configured to evaluate a parameter related to the bonding layer of the sample. The control device includes an elastic wave generation control unit configured to cause the elastic wave generation device to generate the elastic wave from the sample, an elastic wave detection control unit configured to cause the elastic wave detection device to detect an actual value of the reflected elastic wave, and a detection wave evaluation unit configured to evaluate the parameter related to the bonding layer by comparing the actual value of the elastic wave detected by the elastic wave detection device caused by the elastic wave detection control unit with a theoretical value of the elastic wave calculated based on a theoretical model related to the sample.

With this configuration, it is possible to evaluate the bonding layer by using an elastic wave reflected by an elastic body reflection body without breaking the sample.

In this configuration, it is preferable that the elastic wave generation device is an ultrasonic wave emission device configured to emit an ultrasonic wave to the sample, the elastic wave reflection body is an ultrasonic wave reflection body configured to reflect the ultrasonic wave, the elastic wave detection device is an ultrasonic wave detection device configured to detect the reflected ultrasonic wave, and in the control device, the elastic wave generation control unit is an ultrasonic wave emission control unit configured to cause the ultrasonic wave emission device to emit the ultrasonic wave, the elastic wave detection control unit is an ultrasonic wave detection control unit configured to cause the ultrasonic wave detection device to detect an actual value of a double through-transmission wave that is the ultrasonic wave having been once transmitted through a sample that includes a bonding layer and is installed at the sample installation unit, having been reflected by the ultrasonic wave reflection body, and having been further once transmitted through the sample, and the detection wave evaluation unit evaluates whether the bonding layer has a weak bond in evaluation of the parameter related to the bonding layer by comparing the actual value of the double through-transmission wave detected by the ultrasonic wave detection device caused by the ultrasonic wave detection control unit with a theoretical value of the double through-transmission wave calculated based on a theoretical model related to the sample.

With this configuration, it is possible to evaluate whether the bonding layer has a weak bond by using a double through-transmission wave of an ultrasonic wave, and thus it is possible to detect a weak bond without breaking the sample.

In this configuration, it is preferable that the detection wave evaluation unit includes a frequency analysis unit configured to perform frequency analysis on each of the double through-transmission wave and a reference wave that is the ultrasonic wave having never been transmitted through the sample and having been reflected by the ultrasonic wave reflection body, a double through-transmission coefficient calculation unit configured to calculate an actual value of a double through-transmission coefficient that is a parameter related to double through-transmission through the sample based on an intensity ratio of a spectrum of the double through-transmission wave to a spectrum of the reference wave, the spectra being obtained by the frequency analysis unit, and a double through-transmission coefficient comparison unit configured to evaluate whether the bonding layer has a weak bond by comparing the actual value of the double through-transmission coefficient calculated by the double through-transmission coefficient calculation unit with a theoretical value of the double through-transmission coefficient calculated based on a theoretical model. With this configuration, the double through-transmission coefficient, which notably indicates the bonding property of the bonding layer, is used for a double through-transmission wave of an ultrasonic wave, and thus it is possible to evaluate whether the bonding layer has a weak bond at high accuracy.

Further, in this configuration, it is preferable that the detection wave evaluation unit derives a parameter related to bonding at the bonding layer by changing the parameter related to bonding at the bonding layer in the theoretical model so that a peak frequency of the theoretical value of the double through-transmission coefficient matches a peak frequency of the actual value of the double through-transmission coefficient, and evaluates that the bonding layer has a weak bond when the parameter related to bonding at the bonding layer is smaller than the parameter related to bonding when a healthy bond is formed. With this configuration, it is possible to efficiently evaluate whether the bonding layer has a weak bond at higher accuracy.

In this configuration, it is preferable that the detection wave evaluation unit calculates a parameter related to bonding at the bonding layer. With this configuration, it is possible to quantify a detected weak junction.

In these configurations, it is preferable that the sample includes the bonding layer and a sample piece bonded by the bonding layer, the ultrasonic wave emission device emits the ultrasonic wave to an interface of the bonding layer in a perpendicular direction, the theoretical model related to the sample is a theoretical model in which the bonding layer is connected with the sample piece through a spring interface, stiffness of a component in the perpendicular direction is set for the spring interface, and the control device calculates the theoretical value of the double through-transmission wave based on the theoretical model by using a stiffness matrix method. With this configuration, it is possible to evaluate whether the bonding layer has a weak bond by using highly valid theoretical model and calculation method that perform stiffness analysis for a double through-transmission wave of an ultrasonic wave by setting interface stress in a perpendicular direction to an interface at which a factor of a weak bond is likely to actually occur, and thus it is possible to execute weak bond detection backed up by a theoretical model and a calculation method in accordance with reality.

In these configurations, it is preferable that the sample includes the bonding layer and a sample piece bonded by the bonding layer, the ultrasonic wave emission device emits the ultrasonic wave in a tilt direction tilted relative to a perpendicular direction orthogonal to an interface of the bonding layer, the theoretical model related to the sample is a theoretical model in which the bonding layer is connected with the sample piece through a spring interface, stiffness of a component in the perpendicular direction and stiffness of a component in an in-plane direction of the interface are set for the spring interface, and the control device calculates the theoretical value of the double through-transmission wave based on the theoretical model by using a stiffness matrix method. With this configuration, it is possible to evaluate whether the bonding layer has a weak bond by using highly valid theoretical model and calculation method that perform stiffness analysis for a double through-transmission wave of an ultrasonic wave by setting interface stress in a perpendicular direction and an in-plane direction to an interface at which a factor of a weak bond is likely to actually occur, and thus it is possible to execute weak bond detection backed up by a theoretical model and a calculation method in accordance with reality.

Further, in order to solve the problems described above and achieve the object, A bonding layer evaluation method comprising the steps of: causing an elastic wave reflection body to reflect an elastic wave generated from a sample including a bonding layer and detecting an actual value of the reflected elastic wave; and evaluating a parameter related to the bonding layer by comparing the detected actual value of the elastic wave with a theoretical value of the elastic wave calculated based on a theoretical model related to the sample. With this configuration, similarly to the corresponding bonding layer evaluation system, it is possible to evaluate the bonding layer by using an elastic wave reflected by an elastic body reflection body without breaking the sample.

In this configuration, it is preferable that the step of detecting the actual value of the elastic wave is a double through-transmission wave detection step of detecting an actual value of a double through-transmission wave that is an ultrasonic wave as an elastic wave having been twice transmitted through the sample, and the step of evaluating the parameter related to the bonding layer is a detection wave evaluation step of evaluating whether the bonding layer has a weak bond by comparing the actual value of the double through-transmission wave detected at the double through-transmission wave detection step with a theoretical value of the double through-transmission wave calculated based on a theoretical model related to the sample. With this configuration, similarly to the corresponding bonding layer evaluation system, it is possible to evaluate whether the bonding layer has a weak bond by using a double through-transmission wave of an ultrasonic wave, and thus it is possible to detect a weak bond without breaking the sample.

In this configuration, it is preferable that the detection wave evaluation step includes a frequency analysis step of performing frequency analysis on each of the double through-transmission wave and a reference wave that is an ultrasonic wave having never been transmitted through the sample, a double through-transmission coefficient calculation step of calculating an actual value of a double through-transmission coefficient that is a parameter related to double through-transmission through the sample based on an intensity ratio of a spectrum of the double through-transmission wave to a spectrum of the reference wave, the spectra being obtained at the frequency analysis step, and a double through-transmission coefficient comparison step of evaluating whether the bonding layer has a weak bond by comparing the actual value of the double through-transmission coefficient calculated at the double through-transmission coefficient calculation step with a theoretical value of the double through-transmission coefficient calculated based on a theoretical model. With this configuration, similarly to the corresponding bonding layer evaluation system, the double through-transmission coefficient, which notably indicates the bonding property of the bonding layer, is used for a double through-transmission wave of an ultrasonic wave, and thus it is possible to evaluate whether the bonding layer has a weak bond at higher accuracy.

DESCRIPTION OF EMBODIMENTS

Embodiments of the present invention will be described below in detail with reference to the accompanying drawings. Note that the present invention is not limited by the embodiments. Moreover, components in the embodiments include those that can be easily replaced by the skilled person in the art or those identical in effect. In addition, components described below may be combined as appropriate.

First Embodiment

Figure 1:
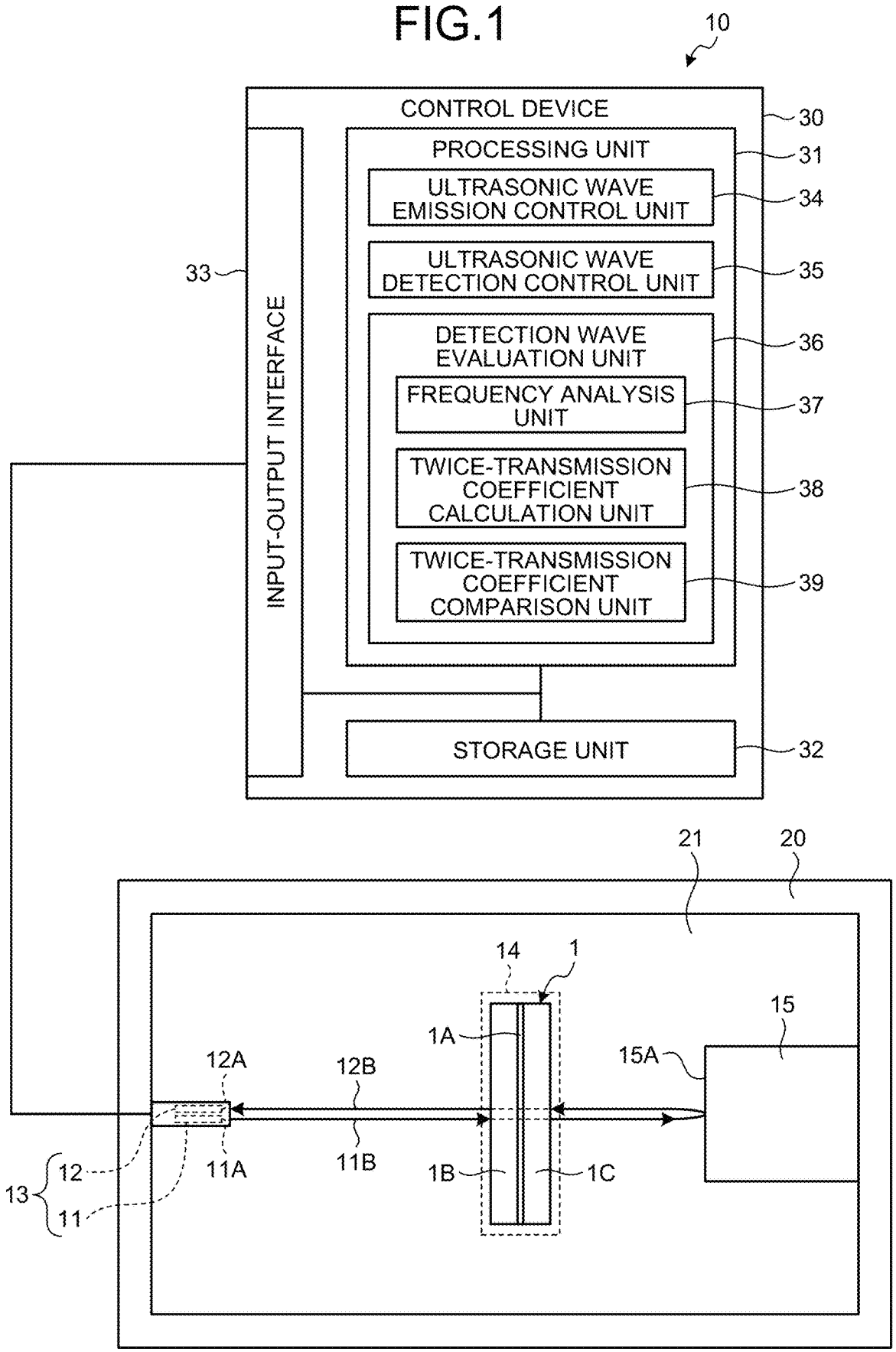
FIG. 1 is a diagram illustrating an exemplary specific configuration of a bonding layer evaluation system according to a first embodiment of the present invention.

FIG. 1 is a diagram illustrating an exemplary specific configuration of a bonding layer evaluation system 10 according to a first embodiment of the present invention. The bonding layer evaluation system 10 is a device configured to detect a double through-transmission wave of a sample 1 including a bonding layer 1A that bonds a sample piece 1B and a sample piece 1C and to evaluate whether the bonding layer 1A has a weak bond (WB) by using the double through-transmission wave of the sample 1. The sample 1 in the present embodiment has a configuration in which the sample piece 1B and the sample piece 1C are aluminum pieces and the bonding layer 1A is a bond film having excellent high-temperature resistance, but the present invention is not limited thereto, and the sample 1 may include the bonding layer 1A and the sample pieces 1B and 1C of any kinds.

The bonding layer evaluation system 10 detects the double through-transmission wave by emitting an ultrasonic wave as an elastic wave toward the sample 1. Note that, in the first embodiment, the bonding layer evaluation system 10 evaluates whether the bonding layer 1A has a weak bond by using the double through-transmission wave of the sample 1, but a parameter related to the bonding layer 1A of the sample 1 may be evaluated by using the double through-transmission wave of the sample 1. The parameter related to the bonding layer 1A includes a parameter (hereinafter also referred to as an interface parameter) related to an interface of the bonding layer 1A, a parameter (hereinafter also referred to as a shape parameter) related to the shape of the bonding layer 1A, and a parameter (hereinafter also referred to as a property parameter) related to a property of the bonding layer 1A.

The interface parameter is, for example, interface stiffness of the bonding layer 1A, and the bonding layer evaluation system 10 in the first embodiment evaluates whether the bonding layer 1A has a weak bond (WB) based on the interface parameter. Moreover, the shape parameter is, for example, the bonding layer thickness, and the bonding layer evaluation system 10 evaluates the thickness of the bonding layer 1A based on the shape parameter. In addition, the property parameter is, for example, the sound speed, mass density, and elastic modulus of the bonding layer 1A, and the bonding layer evaluation system 10 evaluates the property of the bonding layer 1A based on the property parameter. Note that, although the first embodiment describes a case in which interface stiffness (whether there is a weak bond) is evaluated as the parameter related to the bonding layer 1A, the bonding layer thickness may be evaluated as the parameter related to the bonding layer 1A as described above, the interface stiffness and the bonding layer thickness may be both evaluated, or a parameter other than the interface stiffness and the bonding layer thickness may be evaluated, and there is no particular limitation.

As illustrated in FIG. 1, the bonding layer evaluation system 10 includes an ultrasonic wave emission device 11, an ultrasonic wave detection device 12, a sample installation unit 14, an ultrasonic wave reflection body 15, a water tank 20, and a control device 30.

The ultrasonic wave emission device 11 has an emission surface 11A that emits, as an emission wave 11B, for example, an ultrasonic wave of 10 MHz, which is used in typical ultrasonic-wave flaw detection. The ultrasonic wave detection device 12 includes a detection surface 12A that detects a reflected wave 12B that is an ultrasonic wave. In the present embodiment, the ultrasonic wave emission device 11 and the ultrasonic wave detection device 12 are integrated as an ultrasonic wave probe 13, and in addition, the emission surface 11A of the ultrasonic wave emission device 11 and the detection surface 12A of the ultrasonic wave detection device 12 included in the ultrasonic wave probe 13 may be integrated. Moreover, the ultrasonic wave emission device 11 and the ultrasonic wave detection device 12 are not limited to the configuration in which the devices are integrated in the ultrasonic wave probe 13, but may be separately provided.

The sample installation unit 14 is a site where the sample 1, from which a double through-transmission wave is detected, is installed, and for example, a fixation member (not illustrated) to which the sample 1 is fixed or a recess (not illustrated) to which the sample 1 is fitted is provided at the site as appropriate. The sample installation unit 14 is provided across the path of the emission wave 11B between the emission surface 11A of the ultrasonic wave emission device 11 and a reflection surface 15A of the ultrasonic wave reflection body 15. Moreover, the sample installation unit 14 is also provided across the path of the reflected wave 12B between the detection surface 12A of the ultrasonic wave detection device 12 and the reflection surface 15A of the ultrasonic wave reflection body 15.

The ultrasonic wave reflection body 15 has the reflection surface 15A that reflects the emission wave 11B emitted from the ultrasonic wave emission device 11 and generates the reflected wave 12B toward the ultrasonic wave detection device 12. The ultrasonic wave reflection body 15 is disposed in the direction in which an ultrasonic wave is emitted from the ultrasonic wave emission device 11, in other words, the direction in which the emission surface 11A of the ultrasonic wave emission device 11 faces. Moreover, the ultrasonic wave reflection body 15 is also disposed so that the incident angle of the emission wave 11B, which is an angle between the reflection surface 15A and the direction of the emission surface 11A of the ultrasonic wave emission device 11, is equal to the emission angle of the reflected wave 12B, which is an angle between the reflection surface 15A and the direction of the detection surface 12A of the ultrasonic wave detection device 12. Note that, in the present embodiment, the incident angle of the emission wave 11B and the emission angle of the reflected wave 12B are each 0°. The ultrasonic wave reflection body 15 is preferably, for example, a stainless-steel rectangular-parallelepiped block that reflects an ultrasonic wave of 10 MHz.

The water tank 20 accumulates water 21 as an exemplary medium that transfers an ultrasonic wave. As for the water tank 20, for example, a rectangular case is used. In the present embodiment, the emission surface 11A of the ultrasonic wave emission device 11, the detection surface 12A of the ultrasonic wave detection device 12, the sample installation unit 14, and the ultrasonic wave reflection body 15 are provided in an accumulation region of the water 21 inside the water tank 20, and a part opposite to the emission surface 11A of the ultrasonic wave emission device 11, a part opposite to the detection surface 12A of the ultrasonic wave detection device 12, and the control device 30 are provided outside the water tank 20. Note that the water tank 20 is not limited to this configuration but may have any configuration inside which the path of the emission wave 11B and the path of the reflected wave 12B, which include at least the emission surface 11A of the ultrasonic wave emission device 11 and the detection surface 12A of the ultrasonic wave detection device 12, are provided in the accumulation region of the water 21.

The ultrasonic wave emission device 11, the ultrasonic wave detection device 12, the sample installation unit 14, the ultrasonic wave reflection body 15, and the water tank 20 are disposed as described above in the bonding layer evaluation system 10, and thus when the emission wave 11B is emitted from the emission surface 11A of the ultrasonic wave emission device 11, the emitted emission wave 11B is once transmitted through the bonding layer 1A in the water 21 accumulated in the water tank 20, the emission wave 11B having been once transmitted through the bonding layer 1A is reflected by the reflection surface 15A and becomes the reflected wave 12B, the reflected wave 12B is further once transmitted through the bonding layer 1A and becomes a double through-transmission wave, and the reflected wave 12B having become the double through-transmission wave can be detected by the detection surface 12A of the ultrasonic wave detection device 12.

In the present embodiment, the bonding layer evaluation system 10 has a configuration in which the emission surface 11A of the ultrasonic wave emission device 11, the detection surface 12A of the ultrasonic wave detection device 12, the bonding layer 1A of the sample 1 installed at the sample installation unit 14, and the reflection surface 15A of the ultrasonic wave reflection body 15 are disposed in parallel to one another. With this configuration, the bonding layer evaluation system 10 emits the emission wave 11B in a direction orthogonal to the bonding layer 1A and the reflection surface 15A from the emission surface 11A of the ultrasonic wave emission device 11, the emitted emission wave 11B is once transmitted through the bonding layer 1A in a direction orthogonal to the bonding layer 1A, the reflected wave 12B propagates in a direction orthogonal to the bonding layer 1A and the reflection surface 15A and opposite to the emission wave 11B, and the propagating reflected wave 12B is further once transmitted through the bonding layer 1A in a direction orthogonal to the bonding layer 1A and becomes a double through-transmission wave and is detected at the detection surface 12A of the ultrasonic wave detection device 12.

Note that the bonding layer evaluation system 10 is not limited to the above-described configuration, but the ultrasonic wave emission device 11, the ultrasonic wave detection device 12, the sample installation unit 14, the ultrasonic wave reflection body 15, and the water tank 20 may be disposed in any manner that the emission wave 11B can be emitted from the emission surface 11A of the ultrasonic wave emission device 11, can be once transmitted through the bonding layer 1A, can be reflected by the reflection surface 15A and become the reflected wave 12B, can be further once transmitted through the bonding layer 1A and become a double through-transmission wave, and can be detected at the detection surface 12A of the ultrasonic wave detection device 12.

The control device 30 includes a computer system configured to control the bonding layer evaluation system 10. As illustrated in FIG. 1, the control device 30 includes a processing unit 31 including a micro processor such as a central processing unit (CPU), a storage unit 32 including a non-transitory memory such as a read only memory (ROM) or a storage, and a transitory memory such as a random access memory (RAM), and an input-output interface 33 including an input-output circuit that can input and output signals and data.

As illustrated in FIG. 1, the processing unit 31 of the control device 30 includes an ultrasonic wave emission control unit 34, an ultrasonic wave detection control unit 35, and a detection wave evaluation unit 36. The ultrasonic wave emission control unit 34, the ultrasonic wave detection control unit 35, and the detection wave evaluation unit 36 are each a functional component achieved when the processing unit 31 executes a bonding layer evaluation program for the bonding layer evaluation system 10 according to the present embodiment to execute a bonding layer evaluation method according to the present embodiment. Detailed functions of the processing unit 31 of the control device 30, in other words, detailed functions of the ultrasonic wave emission control unit 34, the ultrasonic wave detection control unit 35, and the detection wave evaluation unit 36 will be described below in detailed description of a bonding layer evaluation method according to an embodiment to be described later in addition to detailed description of the configuration of each component.

The ultrasonic wave emission control unit 34 controls the ultrasonic wave emission device 11 and causes the ultrasonic wave emission device 11 to emit the emission wave 11B from the emission surface 11A.

The ultrasonic wave detection control unit 35 controls the ultrasonic wave detection device 12 and causes the ultrasonic wave detection device 12 to detect the reflected wave 12B at the detection surface 12A. In the present embodiment, the ultrasonic wave detection control unit 35 causes the ultrasonic wave detection device 12 to detect a double through-transmission wave that is an ultrasonic wave having been once transmitted through the sample 1 including the bonding layer 1A and installed at the sample installation unit 14, having been reflected by the ultrasonic wave reflection body 15, and having been further once transmitted through the sample 1. Alternatively, in the present embodiment, the sample 1 is not installed at the sample installation unit 14 and the ultrasonic wave detection control unit 35 may cause the ultrasonic wave detection device 12 to detect a reference wave that is an ultrasonic wave having never been transmitted through the sample 1 and having been reflected by the ultrasonic wave reflection body 15.

The detection wave evaluation unit 36 evaluates whether the bonding layer 1A of the sample 1 has a healthy bond (thought as a perfect bond (PB)), in other words, whether the bonding layer 1A of the sample 1 has a weak bond by comparing the actual value of the double through-transmission wave that the ultrasonic wave detection control unit 35 causes the ultrasonic wave detection device 12 to detect and a theoretical value of the double through-transmission wave, which is calculated based on a theoretical model related to the sample 1.

Herein, the theoretical model related to the sample 1 is an analysis model to which the sample 1 is modeled. The detection wave evaluation unit 36 preferably employs, as the theoretical model related to the sample 1, a theoretical model in which the bonding layer 1A is connected through a spring interface, and performs calculation processing by using a stiffness matrix method.

Moreover, a healthy bond is, for example, a bond formed by the bonding layer 1A when bonding strength determined by producing a plurality of samples 1 and performing predetermined breakdown test is included in highest 5%.

The detection wave evaluation unit 36 includes a frequency analysis unit 37, a double through-transmission coefficient calculation unit 38, and a double through-transmission coefficient comparison unit 39. Similarly to the detection wave evaluation unit 36, the frequency analysis unit 37, the double through-transmission coefficient calculation unit 38, and the double through-transmission coefficient comparison unit 39 are each a functional component achieved when the processing unit 31 executes the bonding layer evaluation program for the bonding layer evaluation system 10 according to the present embodiment to execute the bonding layer evaluation method according to the present embodiment. Detailed functions of the detection wave evaluation unit 36, in other words, detailed functions of the frequency analysis unit 37, the double through-transmission coefficient calculation unit 38, and the double through-transmission coefficient comparison unit 39 will be described below in detailed description of a bonding layer evaluation method according to an embodiment to be described later in addition to detailed description of the configuration of each component.

The frequency analysis unit 37 performs frequency analysis of each of a double through-transmission wave and a reference wave that is an ultrasonic wave having never been transmitted through the sample 1 and having been reflected by the ultrasonic wave reflection body 15. More specifically, the frequency analysis unit 37 acquires an amplitude spectrum by performing fast Fourier transform of each of the double through-transmission wave and the reference wave that are temporal functions.

The double through-transmission coefficient calculation unit 38 calculates the intensity ratio of the amplitude spectrum of the double through-transmission wave to the amplitude spectrum of the reference wave from the amplitude spectra of the double through-transmission wave and the reference wave, the amplitude spectra being obtained by the frequency analysis unit 37, and calculates, based on the intensity ratio, the actual value of a double through-transmission coefficient $T^2$ that is a parameter related to double through-transmission through the sample 1. More specifically, the double through-transmission coefficient calculation unit 38 acquires a frequency function of the actual value of the double through-transmission coefficient $T^2$ by dividing the intensity of the amplitude spectrum of the double through-transmission wave by the intensity of the amplitude spectrum of the reference wave for each frequency f. Note that the double through-transmission coefficient $T^2$ is a coefficient having such a property that the coefficient takes a value of 0 to 1 inclusive, taking 0 when no ultrasonic wave is transmitted, and taking 1 when an ultrasonic wave is completely transmitted. Note that the double through-transmission coefficient $T^2$ is 1 or smaller in theory but can take a value equal to or larger than 1 in measurement.

The double through-transmission coefficient comparison unit 39 evaluates whether the bonding layer 1A has a weak bond by comparing the actual value of the double through-transmission coefficient $T^2$, which is calculated by the double through-transmission coefficient calculation unit 38, and a theoretical value of the double through-transmission coefficient $T^2$, which is calculated based on the theoretical model.

Specifically, the double through-transmission coefficient comparison unit 39 compares the frequency f at which the actual value of the double through-transmission coefficient $T^2$, which is calculated by the double through-transmission coefficient calculation unit 38, has a local maximum, and the frequency f at which the theoretical value of the double through-transmission coefficient $T^2$, which is calculated based on the theoretical model, has a local maximum when it is assumed that the bonding layer 1A has no weak bond but a healthy bond, and the double through-transmission coefficient comparison unit 39 evaluates that the bonding layer 1A has no weak bond when the frequencies match each other within a predetermined error, or evaluates that the bonding layer 1A has a weak bond when the frequencies have a significant difference exceeding the predetermined error.

Moreover, hereinafter, the frequency f at which the frequency function of the actual value of the double through-transmission coefficient $T^2$ and a frequency function of the theoretical value of the double through-transmission coefficient $T^2$ both have local maxima is referred to as a peak frequency. The frequency function of the actual value of the double through-transmission coefficient $T^2$ and the frequency function of the theoretical value of the double through-transmission coefficient $T^2$ each typically have a plurality of peak frequencies.

Herein, the reason why the peak frequency of the double through-transmission coefficient $T^2$ is used when the frequency function of the actual value of the double through-transmission coefficient $T^2$ and the frequency function of the theoretical value of the double through-transmission coefficient $T^2$ are compared and contrasted is because a theoretical model that has a reduced calculation amount by considering no ultrasonic wave absorption and scattering that may actually occur at the sample 1 is used, and thus a difference exceeding the predetermined error can occur between the actual and theoretical values of the absolute value of the double through-transmission coefficient $T^2$, but no difference exceeding the predetermined error occurs between the actual and theoretical values of the peak frequency of the double through-transmission coefficient $T^2$.

Part of the peak frequency of the frequency function of the actual value of the double through-transmission coefficient $T^2$ is constant irrespective of the interface parameter of the bonding layer 1A, and the other part tends to change in a one-to-one relation depending on the interface parameter of the bonding layer 1A. Moreover, the peak frequency of the frequency function of the theoretical value of the double through-transmission coefficient $T^2$ has, for the interface parameter of the bonding layer 1A, a tendency same as a tendency that the peak frequency of the frequency function of the actual value of the double through-transmission coefficient $T^2$ has for the interface parameter of the bonding layer 1A. Thus, the predetermined error that may occur to the double through-transmission coefficient $T^2$ can be appropriately set in advance based on a difference that may occur at the peak frequency that is constant irrespective of the interface parameter of the bonding layer 1A. The appropriate setting is, for example, such setting that an error is corrected based on the value of the peak frequency that is constant irrespective of the interface parameter. Herein, the interface parameter of the bonding layer 1A is a parameter of a spring interface when a theoretical model that connection is made through the spring interface is employed, and quantitatively evaluates bonding strength of the bonding layer 1A. Note that, in the first embodiment, the interface parameter is applied as the parameter related to the bonding layer 1A, but when the bonding layer thickness of the bonding layer 1A is evaluated, the shape parameter related to the bonding layer thickness of the bonding layer 1A may be applied. In this case, the shape parameter related to a bonding layer thickness $h_{ad}$ is employed (set) in the theoretical model. Alternatively, the interface parameter, the shape parameter, and the property parameter described above may be all applied as the parameter related to the bonding layer 1A. In this case, for example, parameters related to the sound speed of the bonding layer 1A, the mass density of the bonding layer 1A, and the elastic modulus of the bonding layer 1A are employed as the property parameter and applied to the theoretical model.

Moreover, the double through-transmission coefficient comparison unit 39 calculates, as the parameter related to the bonding layer 1A of the sample 1 for evaluation, the parameter related to the bonding layer 1A in the theoretical model when the frequency f at which the actual value of the double through-transmission coefficient $T^2$, which is calculated by the double through-transmission coefficient calculation unit 38, has a peak and the frequency f at which the theoretical value of the double through-transmission coefficient $T^2$, which is calculated based on the theoretical model, has a peak match each other within the predetermined error.

Moreover, the double through-transmission coefficient comparison unit 39 can more efficiently perform the above-described processing together, and can derive the parameter related to the bonding layer 1A by changing the parameter related to the bonding layer 1A in the theoretical model so that the peak frequency of the theoretical value of the double through-transmission coefficient $T^2$ matches the peak frequency of the actual value of the double through-transmission coefficient $T^2$, and can evaluate that the bonding layer 1A has a weak bond when the parameter related to the bonding layer 1A is smaller than the parameter related to the bonding layer 1A when a healthy bond is formed.

The storage unit 32 of the control device 30 stores various kinds of data used by the processing unit 31 of the control device 30. Specifically, the storage unit 32 of the control device 30 stores data related to shapes, such as materials and thicknesses of the bonding layer 1A, the sample piece 1B, and the sample piece 1C, which is data related to the sample 1, data related to the frequency of an ultrasonic wave of the emission wave 11B from the ultrasonic wave emission device 11 and an emission condition on the normal of the bonding layer 1A and used by the ultrasonic wave emission control unit 34, data related to a condition on detection of the reflected wave 12B by the ultrasonic wave detection device 12 and used by the ultrasonic wave detection control unit 35, data related to fast Fourier transform processing and used by the frequency analysis unit 37 of the detection wave evaluation unit 36, data related to processing of deriving the frequency function of the actual value of the double through-transmission coefficient $T^2$ and used by the double through-transmission coefficient calculation unit 38 of the detection wave evaluation unit 36, data related to the theoretical model used by the double through-transmission coefficient comparison unit 39 of the detection wave evaluation unit 36, data related to processing of comparing the actual value of the double through-transmission coefficient $T^2$ and the theoretical value of the double through-transmission coefficient $T^2$ and used by the double through-transmission coefficient comparison unit 39 of the detection wave evaluation unit 36, and the like. Note that data obtained through measurement by another method in advance is excellently employed as the data related to shapes, such as the thicknesses of the bonding layer 1A, the sample piece 1B, and the sample piece 1C. Alternatively, the data related to shapes, such as the thicknesses of the bonding layer 1A, the sample piece 1B, and the sample piece 1C may be calculated as the parameter related to the bonding layer 1A.

Moreover, the storage unit 32 of the control device 30 may store various kinds of data acquired by the processing unit 31 of the control device 30. Specifically, the storage unit 32 of the control device 30 can store measurement data of the double through-transmission wave and measurement data of the reference wave, which are data of detection of the reflected wave 12B by the ultrasonic wave detection device 12, which is acquired by the ultrasonic wave detection control unit 35, data of a frequency function of the double through-transmission wave and data of a frequency function of the reference wave, which are acquired by the frequency analysis unit 37 of the detection wave evaluation unit 36, data of the frequency function of the actual value of the double through-transmission coefficient $T^2$, which is acquired by the double through-transmission coefficient calculation unit 38 of the detection wave evaluation unit 36, data of the frequency function of the theoretical value of the double through-transmission coefficient $T^2$, which is calculated by the double through-transmission coefficient comparison unit 39 of the detection wave evaluation unit 36, a parameter related to a weak bond at the bonding layer 1A of the sample 1 and calculated by the double through-transmission coefficient comparison unit 39 of the detection wave evaluation unit 36, and the like.

The input-output interface 33 of the control device 30 is connected with the ultrasonic wave probe 13 constituted by the ultrasonic wave emission device 11 and the ultrasonic wave detection device 12. Through the input-output interface 33, the control device 30 controls the ultrasonic wave probe 13 and thus controls the ultrasonic wave emission device 11 and the ultrasonic wave detection device 12, and acquires data of detection of the reflected wave 12B by the ultrasonic wave detection device 12. Moreover, the input-output interface 33 of the control device 30 may be also connected with an input device (not illustrated). The control device 30 can receive, from the input device through the input-output interface 33, input of various kinds of information used for processing by the processing unit 31. Moreover, the input-output interface 33 of the control device 30 may be also connected with a display device (not illustrated). Various kinds of information obtained through processing by the processing unit 31 can be output and displayed as a character, an image, a moving image, or the like on the display device.

Figure 2:
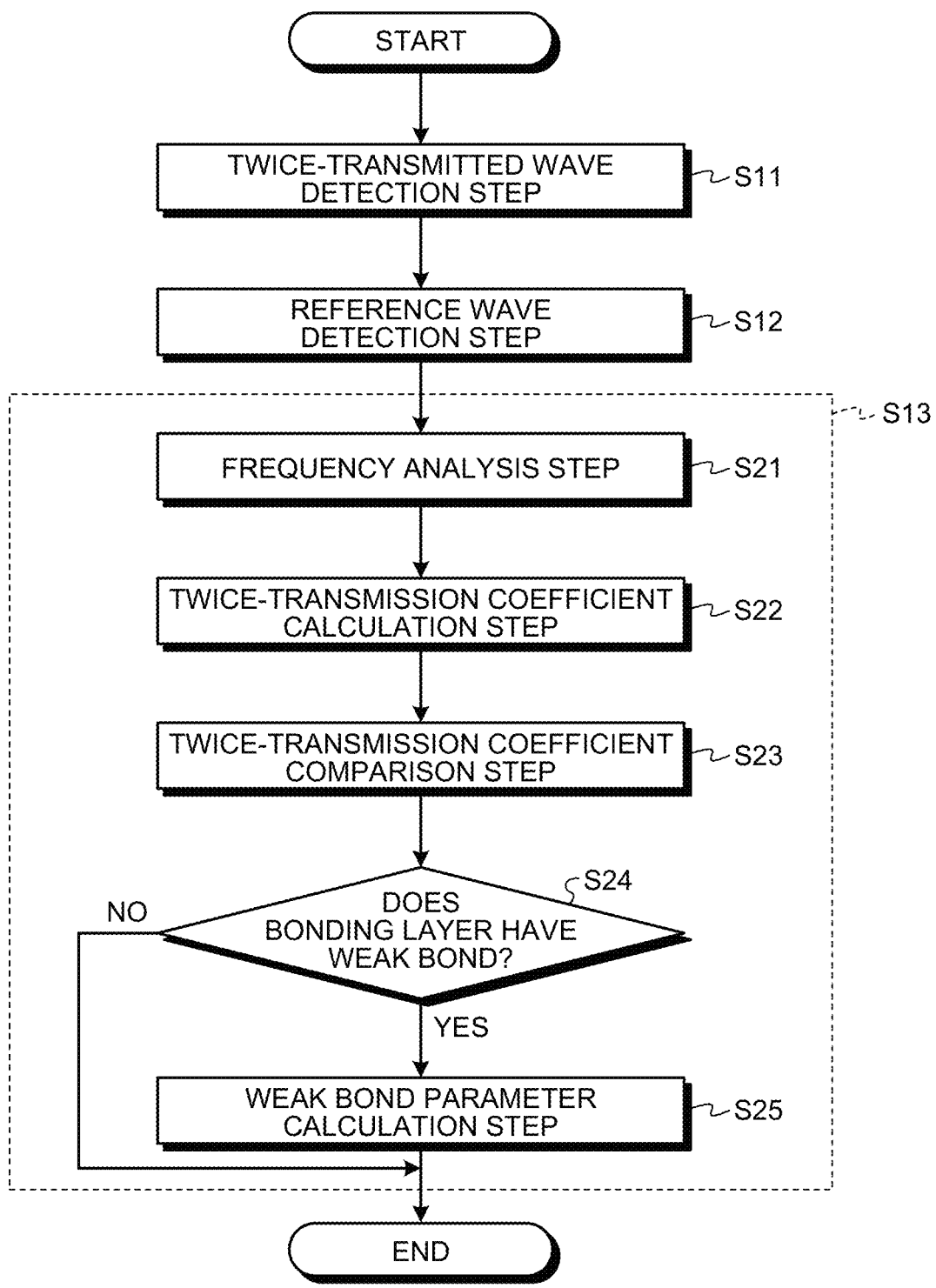
FIG. 2 is a flowchart of a bonding layer evaluation method according to the first embodiment of the present invention.

Effects of the bonding layer evaluation system 10 according to the first embodiment will be described below. FIG. 2 is a flowchart of a bonding layer evaluation method according to the first embodiment of the present invention. The bonding layer evaluation method according to the embodiment, which is executed by the bonding layer evaluation system 10 will be described below together with detailed functions of the ultrasonic wave emission control unit 34, the ultrasonic wave detection control unit 35, and the detection wave evaluation unit 36 in the processing unit 31 of the bonding layer evaluation system 10 and detailed functions of the frequency analysis unit 37, the double through-transmission coefficient calculation unit 38, and the double through-transmission coefficient comparison unit 39 in the detection wave evaluation unit 36.

As illustrated in FIG. 2, the bonding layer evaluation method according to the first embodiment includes a double through-transmission wave detection step S11, a reference wave detection step S12, and a detection wave evaluation step S13.

The double through-transmission wave detection step S11 is a step of detecting the actual value of a double through-transmission wave that is an ultrasonic wave having been twice transmitted through the sample 1 including the bonding layer 1A.

Specifically, first at the double through-transmission wave detection step S11, a state in which the sample 1 including the bonding layer 1A, as a test subject from which the double through-transmission wave is to be detected is installed at the sample installation unit 14 is formed as illustrated in FIG. 1. Subsequently at the double through-transmission wave detection step S11, in this state, the ultrasonic wave emission control unit 34 controls the ultrasonic wave emission device 11 and causes the ultrasonic wave emission device 11 to emit the emission wave 11B from the emission surface 11A toward the sample 1 installed at the sample installation unit 14. Then at the double through-transmission wave detection step S11, the ultrasonic wave detection control unit 35 controls the ultrasonic wave detection device 12 and causes the ultrasonic wave detection device 12 to detect the reflected wave 12B at the detection surface 12A. Accordingly, at the double through-transmission wave detection step S11, the ultrasonic wave detection control unit 35 causes the ultrasonic wave detection device 12 to detect the actual value of the double through-transmission wave of the sample 1 including the bonding layer 1A.

The reference wave detection step S12 is a step of detecting the actual value of a reference wave that is an ultrasonic wave having never been transmitted through the sample 1 including the bonding layer 1A.

Specifically, first at the reference wave detection step S12, a state in which the sample 1 including the bonding layer 1A, as a test subject from which the double through-transmission wave is to be detected is not installed at the sample installation unit 14, in other words, a state in which nothing is installed at the sample installation unit 14 is formed. Subsequently at the reference wave detection step S12, in this state, the ultrasonic wave emission control unit 34 controls the ultrasonic wave emission device 11 and causes the ultrasonic wave emission device 11 to emit the emission wave 11B from the emission surface 11A toward the sample 1 installed at the sample installation unit 14. Then at the reference wave detection step S12, the ultrasonic wave detection control unit 35 controls the ultrasonic wave detection device 12 and causes the ultrasonic wave detection device 12 to detect the reflected wave 12B at the detection surface 12A. Accordingly, at the reference wave detection step S12, the ultrasonic wave detection control unit 35 causes the ultrasonic wave detection device 12 to detect the actual value of the reference wave having never been transmitted through the sample 1 including the bonding layer 1A.

Note that, when the actual value of the reference wave is detected in the past under a condition that the positional relation among the ultrasonic wave emission device 11, the ultrasonic wave detection device 12, and the ultrasonic wave reflection body 15, the water 21 accumulated in the water tank 20, and the like are same, the reference wave detection step S12 may be omitted and the actual value of the reference wave detected in the past may be used again.

The detection wave evaluation step S13 is a step of evaluating whether the bonding layer 1A has a weak bond by comparing the actual value of the double through-transmission wave, which is detected at the double through-transmission wave detection step S11, and the theoretical value of the double through-transmission wave, which is calculated based on the theoretical model related to the sample 1. More specifically, as illustrated in FIG. 2, the detection wave evaluation step S13 includes a frequency analysis step S21, a double through-transmission coefficient calculation step S22, a double through-transmission coefficient comparison step S23, a weak bond existence determination step S24, and a weak bond parameter calculation step S25.

The frequency analysis step S21 is a step of performing frequency analysis of each of the double through-transmission wave obtained at the double through-transmission wave detection step S11 and the reference wave obtained at the current or past reference wave detection step S12.

Specifically, the frequency analysis step S21 is a step at which the frequency analysis unit 37 acquires a frequency function of intensity of an amplitude spectrum by performing fast Fourier transform of each of the double through-transmission wave and the reference wave that are temporal functions.

The double through-transmission coefficient calculation step S22 is a step of calculating the actual value of the double through-transmission coefficient $T^2$, which is a parameter related to double through-transmission through the sample 1, based on the intensity ratio of the amplitude spectrum of the double through-transmission wave to the amplitude spectrum of the reference wave, the amplitude spectra being obtained at the frequency analysis step S21.

Specifically at the double through-transmission coefficient calculation step S22, the double through-transmission coefficient calculation unit 38 acquires the frequency function of the actual value of the double through-transmission coefficient $T^2$ by dividing the intensity of the amplitude spectrum of the double through-transmission wave by the intensity of the amplitude spectrum of the reference wave for each frequency f.

Figure 3:
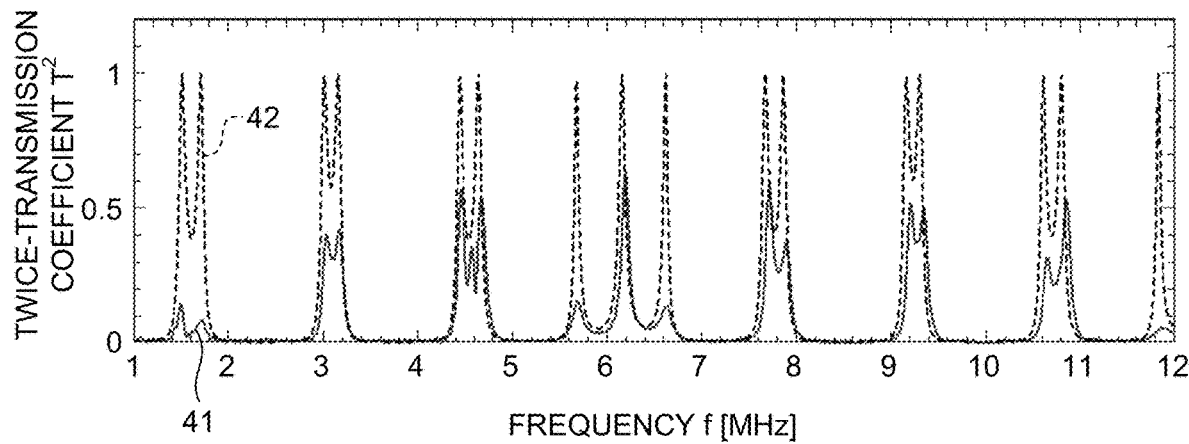
FIG. 3 is an exemplary graph for description of a detection wave evaluation step in FIG. 2.
Figure 4:
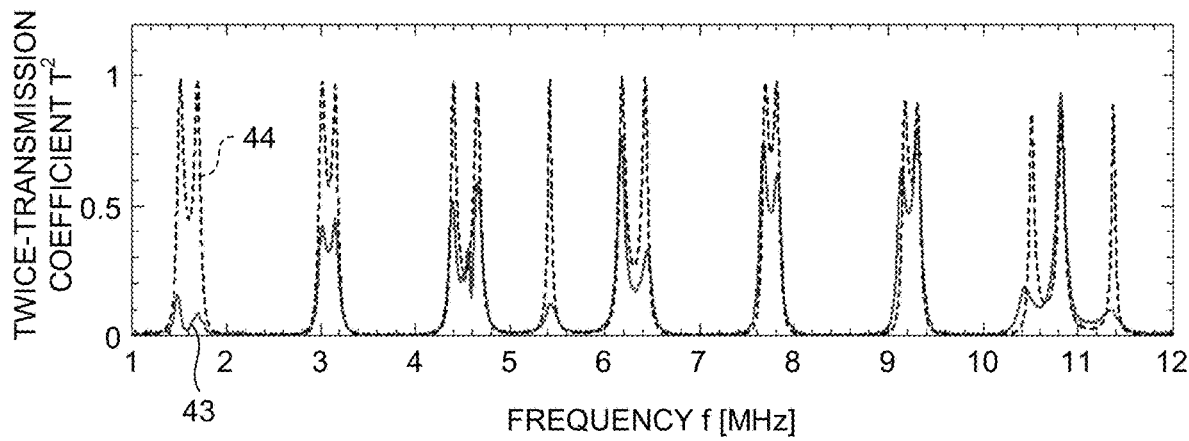
FIG. 4 is another exemplary graph for description of the detection wave evaluation step in FIG. 2.

FIG. 3 is an exemplary graph for description of the detection wave evaluation step S13 in FIG. 2. FIG. 4 is another exemplary graph for description of the detection wave evaluation step S13 in FIG. 2. The graphs in FIGS. 3 and 4 are each a two-dimensional graph with the frequency f [in the unit of Hz] on the horizontal axis and the double through-transmission coefficient $T^2$ on the vertical axis. The graph in FIG. 3 indicates a first example, and the graph in FIG. 4 indicates a second example. At the double through-transmission coefficient calculation step S22, the double through-transmission coefficient calculation unit 38 acquires, for example, a frequency function curve 41 of the actual value of the double through-transmission coefficient $T^2$ of the first example illustrated with a solid line in FIG. 3 and a frequency function curve 43 of the actual value of the double through-transmission coefficient $T^2$ of the second example illustrated with a solid line in FIG. 4.

The double through-transmission coefficient comparison step S23 is a step of evaluating whether the bonding layer 1A has a weak bond by comparing the actual value of the double through-transmission coefficient $T^2$, which is calculated at the double through-transmission coefficient calculation step S22, and the theoretical value of the double through-transmission coefficient $T^2$, which is calculated based on the theoretical model.

Figure 5:
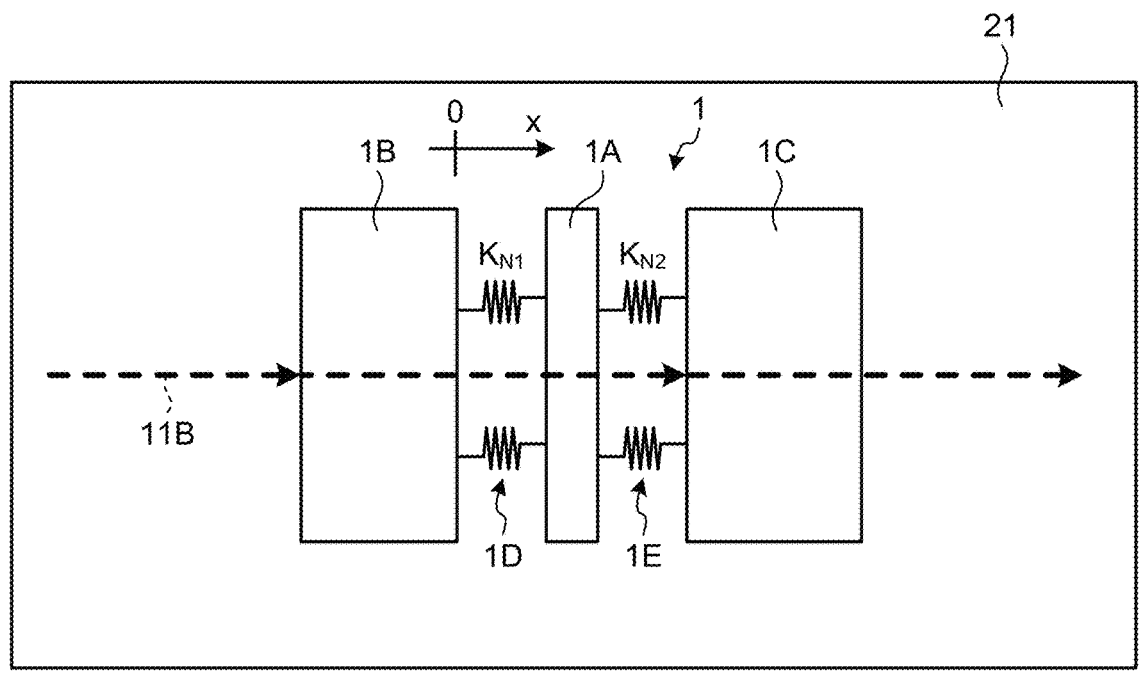
FIG. 5 is an explanatory diagram illustrating an exemplary theoretical model employed when the bonding layer evaluation system in FIG. 1 executes the bonding layer evaluation method in FIG. 2.

FIG. 5 is an explanatory diagram illustrating an exemplary theoretical model employed when the bonding layer evaluation system 10 in FIG. 1 executes the bonding layer evaluation method in FIG. 2. The theoretical model used to calculate the theoretical value of the double through-transmission coefficient $T^2$, which is used at the double through-transmission coefficient comparison step S23, will be described below with reference to FIG. 5.

In the theoretical model used by the double through-transmission coefficient comparison unit 39 at the double through-transmission coefficient comparison step S23, the sample 1 has a configuration in which, as illustrated in FIG. 5, a spring interface 1D is provided at an interface between the sample piece 1B and the bonding layer 1A, a spring interface 1E is provided at an interface between the bonding layer 1A and the sample piece 1C, and the bonding layer 1A is connected through the two spring interfaces 1D and 1E. In this theoretical model, bonding interface stiffness at the spring interface 1D is set by a spring constant $K_{N1}$ [in the unit of MPa/nm], and bonding interface stiffness at the spring interface 1E is set by a spring constant $K_{N2}$ [in the unit of MPa/nm]. Note that the spring constants $KN_1$ and $KN_2$ are parameters having a property that the values thereof indicate bonding interface stiffness. Moreover, the spring constants $K_{N1}$ and $K_{N2}$ are set so that the bonding interface stiffness at the spring interfaces 1D and 1E is the stiffness of a component in the perpendicular direction. Since such a theoretical model is employed in the first embodiment, it is possible to evaluate whether the bonding layer 1A has a weak bond by using a calculation method that is highly valid for the present embodiment in which interface stress is set for both surfaces of the bonding layer 1A at which a factor of a weak bond is likely to actually occur and stiffness analysis is performed for a double through-transmission wave of an ultrasonic wave, and thus it is possible to execute weak bond detection backed up by a theoretical model and a calculation method in accordance with reality.

At the double through-transmission coefficient comparison step S23 in the present embodiment, the double through-transmission coefficient comparison unit 39 uses the theoretical model, assuming that the spring constant $K_{N1}$ among the spring constants $K_{N1}$ and $K_{N2}$ forms a healthy bond and the other spring constant $K_{N2}$ forms a healthy bond or a weak bond, with taken into account that actual flaking and breaking of the sample 1 including the bonding layer 1A is likely to occur at the interface between the bonding layer 1A and the sample piece 1B or the interface between the bonding layer 1A and the sample piece 1C. Note that handling of the spring constants $K_{N1}$ and $K_{N2}$ in the theoretical model is not limited to this method in the present invention, but for example, it may be assumed that the spring constant $K_{N2}$ among the spring constants $K_{N1}$ and $K_{N2}$ forms a healthy bond and the other spring constant $K_{N1}$ forms a healthy bond or a weak bond, or it may be assumed that the spring constants $K_{N1}$ and $K_{N2}$ have the same value and both form healthy bonds or weak bonds.

Moreover, in the present invention, how the spring constants $K_{N1}$ and $K_{N2}$ and the like are provided in the theoretical model is not limited to the above-described method but may be changed as appropriate in accordance with properties of the sample 1. For example, in the present invention, a theoretical model in which a spring interface is provided at only one of the interface between the sample piece 1B and the bonding layer 1A and the interface between the bonding layer 1A and the sample piece 1C and the bonding layer 1A is connected through the one spring interface may be used.

First at the double through-transmission coefficient comparison step S23, the double through-transmission coefficient comparison unit 39 acquires, from the storage unit 32, information of the densities and thicknesses of the bonding layer 1A, the sample piece 1B, and the sample piece 1C and information of the frequency of an ultrasonic wave of the emission wave 11B from the ultrasonic wave emission device 11, which are to be input to the above-described theoretical model.

Subsequently at the double through-transmission coefficient comparison step S23, the double through-transmission coefficient comparison unit 39 inputs the information of the densities and thicknesses of the bonding layer 1A, the sample piece 1B, and the sample piece 1C and the information of the frequency of an ultrasonic wave of the emission wave 11B into the above-described theoretical model and derives, by using the stiffness matrix method, a relational expression that holds among the spring constants $K_{N1}$ and $K_{N2}$, the frequency f, and the double through-transmission coefficient $T^2$.

Then at the double through-transmission coefficient comparison step S23, by using the relational expression that is derived by using the theoretical model and holds among the spring constants $K_{N1}$ and $K_{N2}$, the frequency f, and the double through-transmission coefficient $T^2$, the double through-transmission coefficient comparison unit 39 inputs and fixes a value when a healthy bond is formed to the spring constant $K_{N1}$, sequentially substitutes the frequency f in a range set in advance, and sequentially substitutes the spring constant $K_{N2}$ in the range of zero to the set value of the spring constant $K_{N1}$, thereby calculating the theoretical value of the double through-transmission coefficient $T^2$ for each frequency f in the range set in advance and for each spring constant $K_{N2}$ in the range of zero to the set value of the spring constant $K_{N1}$.

Herein, as for the value of the spring constant $K_{N1}$ when a healthy bond is formed, preferably employed are the values of the spring constants $K_{N1}$ and $K_{N2}$ when the frequency function of the theoretical value of the double through-transmission coefficient $T^2$, which has a peak frequency that matches the peak frequency of the frequency function of the actual value of the double through-transmission coefficient $T^2$ for the sample 1 in which a healthy bond is thought to be formed based on another intensity test or the like, is calculated while it is assumed that the spring constants $K_{N1}$ and $K_{N2}$ are equal to each other.

Figure 6:
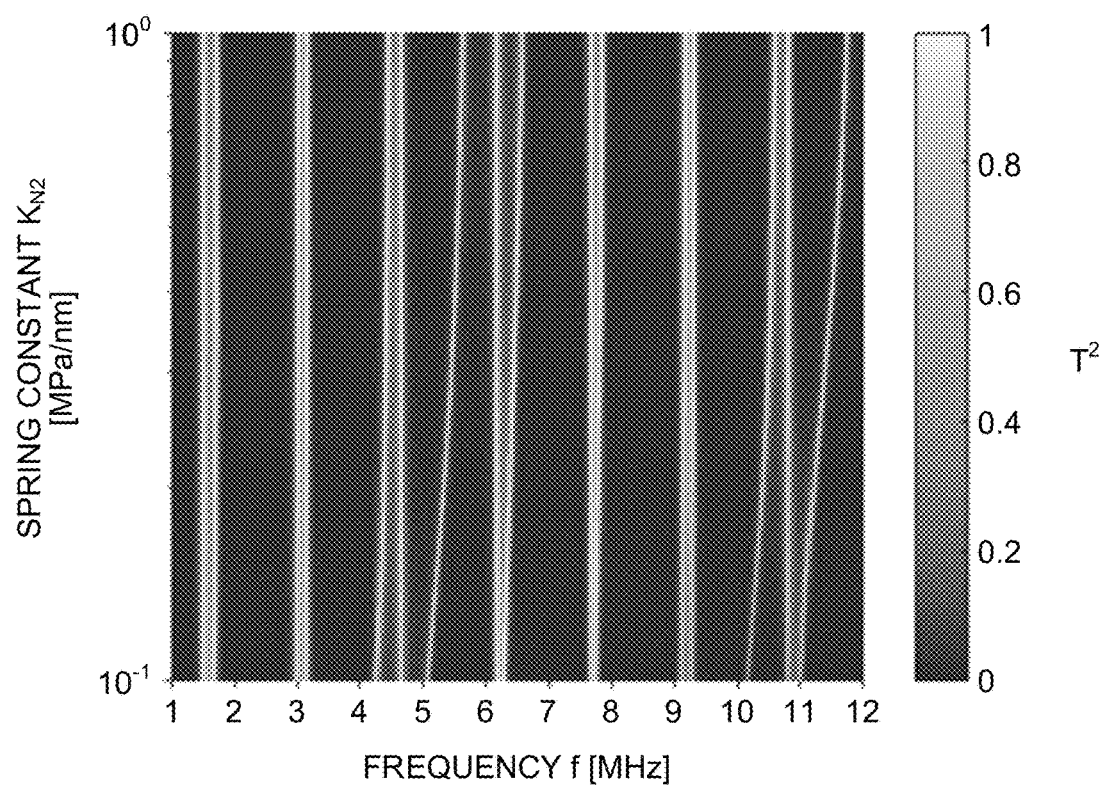
FIG. 6 is a graph illustrating an exemplary theoretical value of a double through-transmission coefficient calculated by using the theoretical model in FIG. 5.

FIG. 6 is a graph illustrating an exemplary theoretical value of the double through-transmission coefficient $T^2$, which is calculated by using the theoretical model in FIG. 5. The graph in FIG. 6 is a three-dimensional graph of the double through-transmission coefficient $T^2$ in grayscale with the frequency f [in the unit of Hz] on the horizontal axis, the spring constant $K_{N2}$ on the vertical axis. A section when FIG. 6 is cut in parallel to the horizontal axis at an optionally selected spring constant $K_{N2}$ is a two-dimensional graph with the frequency f [in the unit of Hz] on the horizontal axis and the double through-transmission coefficient $T^2$ on the vertical axis, which can be compared with the frequency function curves 41 and 42 of the actual value of the double through-transmission coefficient $T^2$. At the double through-transmission coefficient comparison step S23, the double through-transmission coefficient comparison unit 39 acquires a bundle of the frequency function of the theoretical value of the double through-transmission coefficient $T^2$ at each spring constant $K_{N2}$ as illustrated in the three-dimensional graph in FIG. 6.

In addition at the double through-transmission coefficient comparison step S23, the double through-transmission coefficient comparison unit 39 compares the frequency function of the actual value of the double through-transmission coefficient $T^2$, which is acquired at the double through-transmission coefficient calculation step S22, and the frequency function of the theoretical value of the double through-transmission coefficient $T^2$ when a healthy bond is formed and the spring constant $K_{N2}$ is equal to the spring constant $K_{N1}$ in the bundle of the frequency function of the theoretical value of the double through-transmission coefficient $T^2$ at each spring constant $K_{N2}$, which is acquired through processing so far at the double through-transmission coefficient comparison step S23. Then at the double through-transmission coefficient comparison step S23, the double through-transmission coefficient comparison unit 39 evaluates that the bonding layer 1A has no weak bond when each of a plurality of peak frequencies of the double through-transmission coefficient $T^2$ matches within a predetermined error between the two frequency functions, or the double through-transmission coefficient comparison unit 39 evaluates that the bonding layer 1A has a weak bond when any peak frequency of the double through-transmission coefficient $T^2$ has a significant difference exceeding the predetermined error between the two frequency functions.

At the double through-transmission coefficient comparison step S23, for example, when the double through-transmission coefficient calculation unit 38 acquires the frequency function curve 41 of the actual value of the double through-transmission coefficient $T^2$ of the first example at the double through-transmission coefficient calculation step S22, the double through-transmission coefficient comparison unit 39 evaluates that the bonding layer 1A of the sample 1 used to detect the double through-transmission wave in the first example has no weak bond because each of a plurality of peak frequencies matches within the predetermined error between the frequency function curve 41 of the actual value of the double through-transmission coefficient $T^2$ of the first example and the frequency function curve 42 of the theoretical value of the double through-transmission coefficient $T^2$, which is illustrated with a dashed line in FIG. 3, when a healthy bond is formed and the spring constant $K_{N2}$ is equal to the spring constant $K_{N1}$.

On the other hand, at the double through-transmission coefficient comparison step S23, for example, when the double through-transmission coefficient calculation unit 38 acquires the frequency function curve 43 of the actual value of the double through-transmission coefficient $T^2$ of the second example at the double through-transmission coefficient calculation step S22, the double through-transmission coefficient comparison unit 39 evaluates that the bonding layer 1A of the sample 1 used to detect the double through-transmission wave in the second example has a weak bond because some peak frequencies have a significant difference exceeding the predetermined error between the frequency function curve 43 of the actual value of the double through-transmission coefficient $T^2$ of the second example and the frequency function curve of the theoretical value of the double through-transmission coefficient $T^2$ when a healthy bond is formed and the spring constant $K_{N2}$ is equal to the spring constant $K_{N1}$.

The weak bond existence determination step S24 is a step at which, when having evaluated that the bonding layer 1A has no weak bond at the double through-transmission coefficient comparison step S23, the double through-transmission coefficient comparison unit 39 determines that a bond is not weak (No at the weak bond existence determination step S24) and ends the bonding layer evaluation method according to the embodiment without executing the weak bond parameter calculation step S25, or when having evaluated that the bonding layer 1A has a weak bond at the double through-transmission coefficient comparison step S23, the double through-transmission coefficient comparison unit 39 determines that a bond is weak (Yes at the weak bond existence determination step S24) and advances processing to the weak bond parameter calculation step S25.

At the weak bond existence determination step S24, for example, in a case of the first example illustrated in FIG. 3 for which it is evaluated that the bonding layer 1A has no weak bond at the double through-transmission coefficient comparison step S23, the double through-transmission coefficient comparison unit 39 determines that a bond is not weak, and ends the bonding layer evaluation method according to the embodiment without executing the weak bond parameter calculation step S25. On the other hand, at the weak bond existence determination step S24, for example, in a case of the second example illustrated in FIG. 4 for which it is evaluated that the bonding layer 1A has a weak bond at the double through-transmission coefficient comparison step S23, the double through-transmission coefficient comparison unit 39 determines that a bond is weak, and advances processing to the weak bond parameter calculation step S25.

The weak bond parameter calculation step S25 is a step of calculating a parameter related to a weak bond that the bonding layer 1A has. Specifically at the weak bond parameter calculation step S25, the double through-transmission coefficient comparison unit 39 calculates, as the parameter related to a weak bond that the bonding layer 1A of the sample 1 for evaluation has, the value of the spring constant $K_{N2}$ when the peak frequencies of the frequency function of the actual value of the double through-transmission coefficient $T^2$, which is acquired at the double through-transmission coefficient calculation step S22 match, within the predetermined error, the plurality of respective peak frequencies of the frequency function of the theoretical value of the double through-transmission coefficient $T^2$, which is acquired at the double through-transmission coefficient comparison step S23.

Some peak frequencies of the frequency function of the actual value of the double through-transmission coefficient $T^2$, which is acquired at the double through-transmission coefficient calculation step S22, change depending on the value of the spring constant $K_{N2}$ as illustrated in FIG. 6 when the theoretical model described in the present embodiment is used. Moreover, for a peak at which a peak frequency changes depending on the value of the spring constant $K_{N2}$, it is understood that the value of the spring constant $K_{N2}$ and the peak frequency have a one-to-one relation as illustrated in FIG. 6. Thus, at the weak bond parameter calculation step S25, the double through-transmission coefficient comparison unit 39 can uniquely calculate the value of the spring constant $K_{N2}$ based on the peak frequency of the frequency function of the actual value of the double through-transmission coefficient $T^2$ by using the frequency function of the actual value of the double through-transmission coefficient $T^2$, which is acquired at the double through-transmission coefficient calculation step S22.

At the weak bond parameter calculation step S25, for example, when the double through-transmission coefficient calculation unit 38 acquires the frequency function curve 43 of the actual value of the double through-transmission coefficient $T^2$ of the second example at the double through-transmission coefficient calculation step S22, the double through-transmission coefficient comparison unit 39 calculates the bonding strength of a weak bond that the bonding layer 1A of the sample 1 used to detect the double through-transmission wave in the second example has to be 0.21 times larger than that of a healthy bond serving as a reference because each of a plurality of peak frequencies matches within the predetermined error between the frequency function curve 43 of the actual value of the double through-transmission coefficient $T^2$ of the second example and a frequency function curve 44 of the theoretical value of the double through-transmission coefficient $T^2$, which is illustrated with a dashed line in FIG. 4 when the ratio of the spring constant $KN_2$ relative to the spring constant $K_{N1}$ is 0.21.

Moreover, the processing at the double through-transmission coefficient comparison step S23 can be efficiently executed in a form including the processing at the weak bond existence determination step S24 and the weak bond parameter calculation step S25 described above in effect. In this case, specifically at the double through-transmission coefficient comparison step S23, the double through-transmission coefficient comparison unit 39 can derive the spring constant $K_{N2}$, which is a parameter related to bonding at the bonding layer 1A in the theoretical model, by changing the spring constant $K_{N2}$ as the parameter related to bonding at the bonding layer 1A so that the peak frequency of the theoretical value of the double through-transmission coefficient $T^2$ matches the peak frequency of the actual value of the double through-transmission coefficient $T^2$, and can evaluate that the bonding layer 1A has a weak bond when the spring constant $K_{N2}$ as the parameter related to bonding at the bonding layer 1A is smaller than the spring constant $K_{N1}$, which is a parameter related to bonding when a healthy bond is formed.

Note that the bonding layer evaluation method according to the embodiment, which includes the double through-transmission wave detection step S11, the reference wave detection step S12, and the detection wave evaluation step S13, is preferably performed at a plurality of positions in the in-plane direction of the bonding layer 1A of the sample 1 to calculate distribution of the existence of a weak bond at the bonding layer 1A in the in-plane direction and distribution of the bonding strength at the bonding layer 1A in the in-plane direction.

Figure 7:
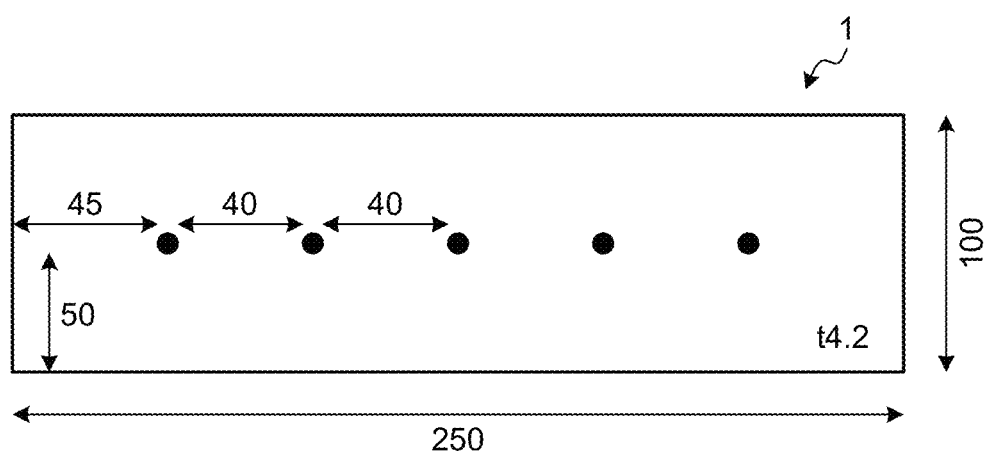
FIG. 7 is an explanatory diagram of bonding layer evaluation positions when the bonding layer evaluation system in FIG. 1 executes the bonding layer evaluation method in FIG. 2.

FIG. 7 is an explanatory diagram of bonding layer evaluation positions when the bonding layer evaluation method in FIG. 2 is executed in the bonding layer evaluation system 10 in FIG. 1. For example, when the bonding layer 1A of the sample 1 is shaped in a rectangle having in-plane direction sizes of 250 mm in the lateral direction and 100 mm in the longitudinal direction, the bonding layer evaluation method according to the embodiment is performed at five bonding layer evaluation positions disposed at the center in the longitudinal direction and at the interval of 40 mm in the lateral direction as illustrated in FIG. 7, thereby calculating the existence of a weak bond and the bonding strength at the five bonding layer evaluation positions. Note that bonding layer evaluation positions are preferably provided at a small interval in accordance with the resolution of an ultrasonic wave measurement in the in-plane direction.

The bonding layer evaluation system 10 and the bonding layer evaluation method performed by the bonding layer evaluation system 10, which are configured as described above, can evaluate whether the bonding layer 1A has a weak bond by using a double through-transmission wave of an ultrasonic wave, and thus can detect a weak bond without breaking the sample 1.

Moreover, the bonding layer evaluation system 10 and the bonding layer evaluation method performed by the bonding layer evaluation system 10 calculate the actual value of the double through-transmission coefficient $T^2$ based on the intensity ratio of the spectrum of the double through-transmission wave to the spectrum the reference wave, the spectra being obtained by performing frequency analysis of each of the double through-transmission wave and the reference wave, and evaluate whether the bonding layer 1A has a weak bond by comparing the actual value of the double through-transmission coefficient $T^2$ and the theoretical value of the double through-transmission coefficient $T^2$, which is calculated based on the theoretical model. Accordingly, the bonding layer evaluation system 10 and the bonding layer evaluation method performed by the bonding layer evaluation system 10 use the double through-transmission coefficient, which notably indicates the bonding property of the bonding layer 1A, for a double through-transmission wave of an ultrasonic wave, and thus can evaluate whether the bonding layer 1A has a weak bond at high accuracy.

Moreover, in the bonding layer evaluation system 10 and the bonding layer evaluation method performed by the bonding layer evaluation system 10, the detection wave evaluation unit 36 derives the spring constant $K_{N2}$ as the parameter related to bonding at the bonding layer 1A by changing the spring constant $K_{N2}$ as the parameter related to bonding at the bonding layer 1A in the theoretical model so that the peak frequency of the theoretical value of the double through-transmission coefficient matches the peak frequency of the actual value of the double through-transmission coefficient, and evaluates that the bonding layer 1A has a weak bond when the spring constant $K_{N2}$ as the parameter related to bonding at the bonding layer 1A is smaller than the spring constant $K_{N1}$ as the parameter related to bonding when a healthy bond is formed. Thus, the bonding layer evaluation system 10 and the bonding layer evaluation method performed by the bonding layer evaluation system 10 can efficiently evaluate whether the bonding layer 1A has a weak bond at higher accuracy.

Moreover, the bonding layer evaluation system 10 and the bonding layer evaluation method performed by the bonding layer evaluation system 10 calculate the value of the spring constant $K_{N2}$ as the parameter related to bonding at the bonding layer 1A. Thus, the bonding layer evaluation system 10 and the bonding layer evaluation method performed by the bonding layer evaluation system 10 can quantify a detected weak bond.

Moreover, the bonding layer evaluation system 10 and the bonding layer evaluation method performed by the bonding layer evaluation system 10 employ, as the theoretical model related to the sample 1, a theoretical model in which the bonding layer 1A is connected through the two spring interfaces 1D and 1E, and perform calculation processing of the theoretical value of the double through-transmission coefficient $T^2$ and the like by using the stiffness matrix method. Thus, the bonding layer evaluation system 10 and the bonding layer evaluation method performed by the bonding layer evaluation system 10 can evaluate whether the bonding layer 1A has a weak bond by using highly valid theoretical model and calculation method that perform stiffness analysis for a double through-transmission wave of an ultrasonic wave by setting interface stress to an interface at which a factor of a weak bond is likely to actually occur, and thus it is possible to execute weak bond detection backed up by a theoretical model and a calculation method in accordance with reality.

Note that, in the first embodiment, the ultrasonic wave probe 13 configured to emit an ultrasonic wave toward the sample 1 and detect the ultrasonic wave reflected by the sample 1 is used as the ultrasonic wave emission device 11 and the ultrasonic wave detection device 12, but the present invention is not limited thereto. For example, the sample 1 may be excited, and an elastic wave generated from the sample 1 may be detected. A device configured to excite the sample 1 may be, for example, a device configured to excite the sample 1 by a sound field and an elastic wave field, an electromagnetic wave using an ultrasonic wave transducer, a laser, an EMAT, or the like or by an electromagnetic field as an electric field, a magnetic field, or the like. In a case in which an elastic wave is excited from the sample 1 by a sound field and an elastic wave field, as well, part of the elastic wave is transmitted through the sample, and thus a parameter can be estimated by comparing frequency-dependent transmission coefficients.

Moreover, in the first embodiment, bonding interface stiffness based on the spring constants $K_{N1}$ and $K_{N2}$ is calculated as the parameter related to the bonding layer 1A, but the bonding layer thickness $h_{ad}$ can be calculated by using the same method by incorporating a thickness $h_{ad}$ of the bonding layer as the parameter related to the bonding layer 1A in a theoretical model. Similarly, the property parameter can be calculated by using the same method by incorporating, as the parameter related to the bonding layer 1A, the property parameter in addition to the interface parameter of the interface stiffness and the shape parameter of the bonding layer thickness $h_{ad}$ described above.

Moreover, in the first embodiment, the peak frequency of the amplitude spectrum is applied as a frequency characteristic, but the present invention is not particularly limited thereto. Any frequency characteristic may be applied as long as evaluation of the parameter related to the bonding layer 1A is possible by matching a theoretical value of the frequency characteristic of the double through-transmission wave, which is calculated by using a theoretical model, to the actual value of the frequency characteristic of the double through-transmission wave, which is detected by the ultrasonic wave detection device 12.

Second Embodiment

Figure 8:
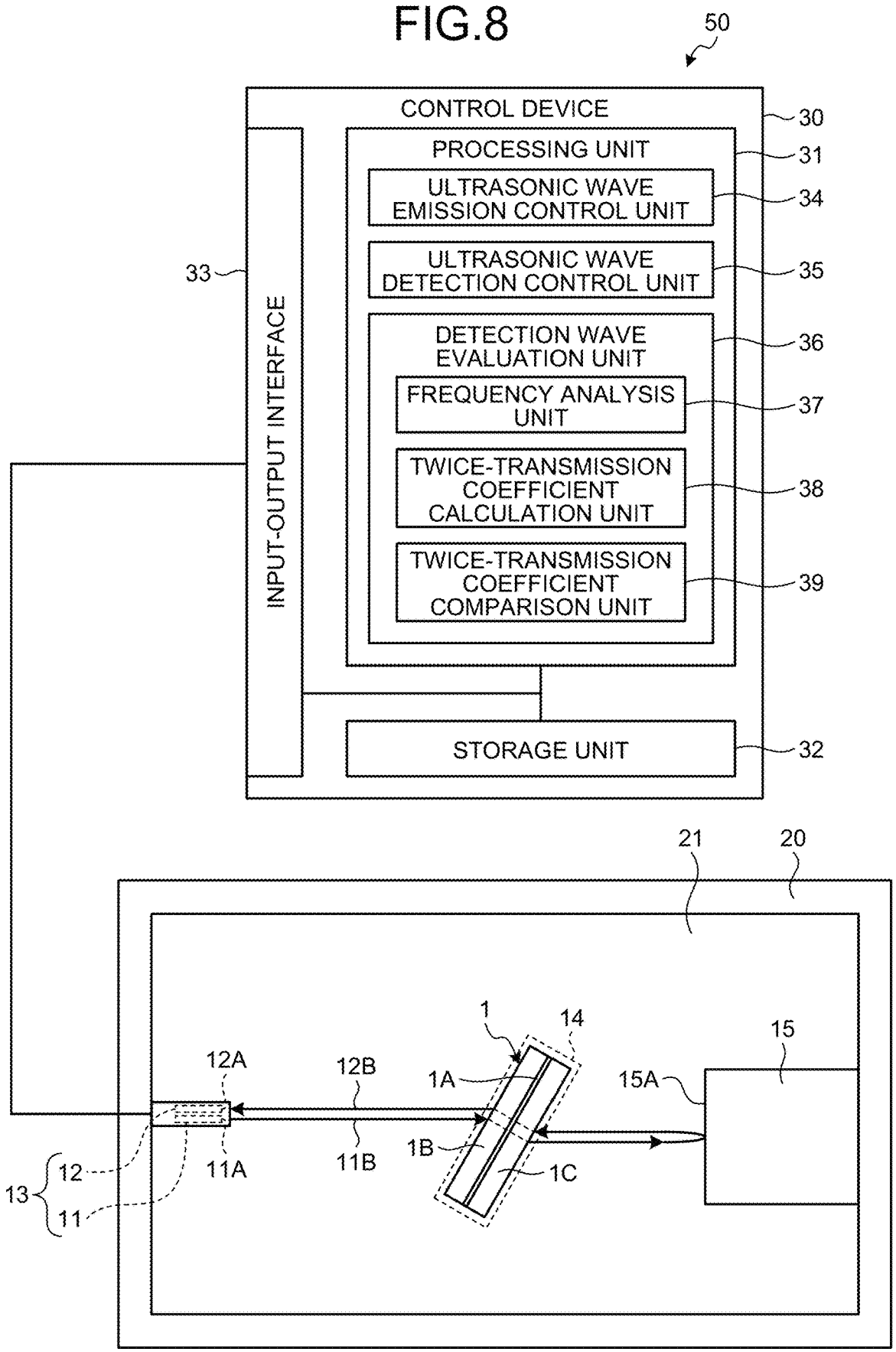
FIG. 8 is a diagram illustrating an exemplary specific configuration of a bonding layer evaluation system according to a second embodiment of the present invention.
Figure 9:
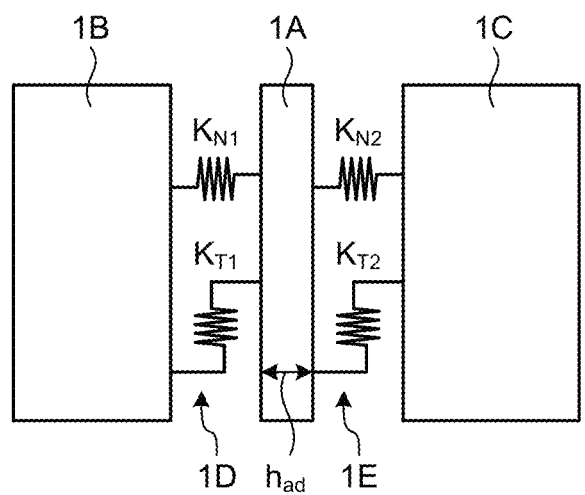
FIG. 9 is an explanatory diagram illustrating an exemplary theoretical model employed at the bonding layer evaluation system according to the second embodiment of the present invention.

Subsequently, a bonding layer evaluation system 50 and a bonding layer evaluation method according to a second embodiment will be described below with reference to FIGS. 8 and 9. Note that, in the second embodiment, any difference from the first embodiment will be described to avoid duplicate description, and any part having a configuration same as that in the first embodiment is denoted by the same reference sign in the description. FIG. 8 is a diagram illustrating an exemplary specific configuration of the bonding layer evaluation system according to the second embodiment of the present invention. FIG. 9 is an explanatory diagram illustrating an exemplary theoretical model employed by the bonding layer evaluation system according to the second embodiment of the present invention.

The bonding layer evaluation system 50 of the second embodiment performs oblique emission in which an ultrasonic wave is emitted at a predetermined tilt angle to a bonding interface of the bonding layer 1A of the sample 1, which faces the ultrasonic wave emission device 11 of the first embodiment. Accordingly, the sample 1 installed at the sample installation unit 14 is disposed at a tilt relative to the direction in which the emission wave 11B is emitted. Thus, the ultrasonic wave emission device 11 emits the emission wave 11B at a predetermined incident angle to the bonding interface of the bonding layer 1A of the sample 1. The ultrasonic wave detection device 12 detects the reflected wave 12B reflected by the ultrasonic wave reflection body 15.

Moreover, in the bonding layer evaluation system 50, the interface of the bonding layer 1A of the sample 1 installed at the sample installation unit 14 is disposed at a tilt relative to the emission surface 11A of the ultrasonic wave emission device 11 and the detection surface 12A of the ultrasonic wave detection device 12 and disposed at a tilt relative to the reflection surface 15A of the ultrasonic wave reflection body 15. Note that the emission surface 11A of the ultrasonic wave emission device 11, the detection surface 12A of the ultrasonic wave detection device 12, and the reflection surface 15A of the ultrasonic wave reflection body 15 are disposed in parallel to one another. Accordingly, in the bonding layer evaluation system 50, the sample 1 is disposed relative to the interface of the bonding layer 1A of the sample 1 so that an ultrasonic wave is emitted and transmitted in a tilt direction tilted relative to the perpendicular direction.

In the bonding layer evaluation system 50, the ultrasonic wave emission device 11, the ultrasonic wave detection device 12, the sample installation unit 14, the ultrasonic wave reflection body 15, and the water tank 20 are disposed as described above, and thus when the emission wave 11B is emitted from the emission surface 11A of the ultrasonic wave emission device 11, the emitted emission wave 11B is once transmitted through the bonding layer 1A at the predetermined incident angle in the water 21 accumulated in the water tank 20, the emission wave 11B having been once transmitted through the bonding layer 1A is reflected by the reflection surface 15A and becomes the reflected wave 12B, the reflected wave 12B is emitted to the sample 1 at the predetermined incident angle, further once transmitted through the bonding layer 1A, and becomes a double through-transmission wave, and the reflected wave 12B as the double through-transmission wave can be detected at the detection surface 12A of the ultrasonic wave detection device 12.

In the double through-transmission coefficient comparison unit 39 of the control device 30, since a detected ultrasonic wave is the double through-transmission wave in the tilt direction, a theoretical model used to calculate the theoretical value of the double through-transmission coefficient $T^2$ used at the double through-transmission coefficient comparison step S23 is the theoretical model illustrated in FIG. 9.

In the theoretical model illustrated in FIG. 9, the sample 1, the spring interface 1D is provided at the interface between the sample piece 1B and the bonding layer 1A, the spring interface 1E is provided at the interface between the bonding layer 1A and the sample piece 1C, and the bonding layer 1A is connected through the two spring interfaces 1D and 1E. In the theoretical model, bonding interface stiffness at the spring interface 1D is set by the spring constant $K_{N1}$ [in the unit of MPa/nm] and a spring constant $K_{T1}$ [in the unit of MPa/nm], and bonding interface stiffness at the spring interface 1E is set by the spring constant $K_{N2}$ [in the unit of MPa/nm] and a spring constant $K_{T2}$ [in the unit of MPa/nm]. The spring constants $K_{N1}$ and $K_{N2}$ are set so that the bonding interface stiffness at the spring interfaces 1D and 1E is the stiffness of a component in the perpendicular direction. The spring constants $K_{T1}$ and $K_{T2}$ are set so that the bonding interface stiffness at the spring interfaces 1D and 1E is the stiffness of a component in the in-plane direction of a bonding interface orthogonal to the perpendicular direction.

Note that the bonding layer evaluation method using the bonding layer evaluation system 50 of the second embodiment is achieved by using the theoretical model of the second embodiment in place of the theoretical model of the first embodiment. Specifically, the spring constant $K_{N2}$ of the stiffness of the component in the perpendicular direction and the spring constant $K_{T2}$ of the stiffness of the component in the in-plane direction can be considered for the double through-transmission coefficient $T^2$ calculated by using the theoretical model of the second embodiment. Thus, not only the bonding interface stiffness in the perpendicular direction but also the bonding interface stiffness in the in-plane direction (shear direction) can be evaluated for the bonding layer 1A.

Specifically, at the double through-transmission coefficient comparison step S23, a relational expression that holds among the spring constants $K_{N1}$, $K_{N2}$, $K_{T1}$, and $K_{T2}$, the frequency f, and the double through-transmission coefficient $T^2$ is derived by the stiffness matrix method using the theoretical model illustrated in FIG. 9. Then at the double through-transmission coefficient comparison step S23, by using the derived relational expression, values when a healthy bond is formed are input and fixed to the spring constants $K_{N1}$ and $K_{T1}$, the frequency f in a range set in advance sequentially substituted, the spring constants $K_{N2}$ and $K_{T2}$ in the range of zero to the set values of the spring constants $K_{N1}$ and $K_{T1}$ are sequentially substituted, thereby calculating the theoretical value of the double through-transmission coefficient $T^2$ for each frequency f in the range set in advance and for each spring constants $K_{N2}$ and $K_{T2}$ in the range of zero to the set values of the spring constants $K_{N1}$ and $K_{T1}$.

In addition at the double through-transmission coefficient comparison step S23, the double through-transmission coefficient comparison unit 39 compares the frequency function of the actual value of the double through-transmission coefficient $T^2$, which is acquired at the double through-transmission coefficient calculation step S22, and the frequency function of the theoretical value of the double through-transmission coefficient $T^2$ for a healthy bond, which is acquired at the double through-transmission coefficient comparison step S23. At the double through-transmission coefficient comparison step S23, the double through-transmission coefficient comparison unit 39 evaluates that the bonding layer 1A has no weak bond when each of a plurality of peak frequencies of the double through-transmission coefficient $T^2$ matches within a predetermined error between the two frequency functions, or the double through-transmission coefficient comparison unit 39 evaluates that the bonding layer 1A has a weak bond when any peak frequency of the double through-transmission coefficient $T^2$ has a significant difference exceeding the predetermined error between the two frequency functions. Note that any other step in the bonding layer evaluation method using the bonding layer evaluation system 50 of the second embodiment is same, and thus description thereof is omitted.

As described above, according to the second embodiment, it is possible to evaluate whether the bonding layer 1A has a weak bond in the perpendicular direction and the in-plane direction at the interface of the bonding layer 1A, and thus it is possible to detect a weak bond without breaking the sample 1.

REFERENCE SIGNS LIST

1 Sample
1A Bonding layer
1B, 1C Sample piece
1D, 1E Spring interface
10 Bonding layer evaluation system
11 Ultrasonic wave emission device
11A Emission surface
11B Emission wave
12 Ultrasonic wave detection device
12A Detection surface
12B Reflected wave
13 Ultrasonic wave probe
14 Sample installation unit
15 Ultrasonic wave reflection body
15A Reflection surface
20 Water tank
21 Water
30 Control device
31 Processing unit
32 Storage unit
33 Input-output interface
34 Ultrasonic wave emission control unit
35 Ultrasonic wave detection control unit
36 Detection wave evaluation unit
37 Frequency analysis unit
38 Double through-transmission coefficient calculation unit
39 Double through-transmission coefficient comparison unit
41, 42, 43, 44 Frequency function curve
50 Bonding layer evaluation system

The invention claimed is:

1. A bonding layer evaluation system comprising:
an elastic wave generation device configured to generate an elastic wave from a sample including a bonding layer;
an elastic wave reflection body configured to reflect the elastic wave generated from the sample;
a sample installation unit provided between the elastic wave generation device and the elastic wave reflection body;
an elastic wave detection device disposed in a direction in which the elastic wave is reflected by the elastic wave reflection body, the elastic wave detection device being configured to detect the reflected elastic wave; and
a control device configured to evaluate a parameter related to the bonding layer of the sample, wherein
the control device includes
an elastic wave generation control unit configured to cause the elastic wave generation device to generate the elastic wave from the sample,
an elastic wave detection control unit configured to cause the elastic wave detection device to detect an actual value of the reflected elastic wave, and
a detection wave evaluation unit configured to evaluate the parameter related to the bonding layer by comparing the actual value of the elastic wave detected by the elastic wave detection device caused by the elastic wave detection control unit with a theoretical value of the elastic wave calculated based on a theoretical model related to the sample, wherein the elastic wave generation device is an ultrasonic wave emission device configured to emit an ultrasonic wave to the sample, the elastic wave reflection body is an ultrasonic wave reflection body configured to reflect the ultrasonic wave, the elastic wave detection device is an ultrasonic wave detection device configured to detect the reflected ultrasonic wave, and in the control device, the elastic wave generation control unit is an ultrasonic wave emission control unit configured to cause the ultrasonic wave emission device to emit the ultrasonic wave, the elastic wave detection control unit is an ultrasonic wave detection control unit configured to cause the ultrasonic wave detection device to detect an actual value of a double through-transmission wave that is the ultrasonic wave having been once transmitted through a sample that includes a bonding layer and is installed at the sample installation unit, having been reflected by the ultrasonic wave reflection body, and having been further once transmitted through the sample, and the detection wave evaluation unit evaluates whether the bonding layer has a weak bond in evaluation of the parameter related to the bonding layer by comparing the actual value of the double through-transmission wave detected by the ultrasonic wave detection device caused by the ultrasonic wave detection control unit with a theoretical value of the double through-transmission wave calculated based on a theoretical model related to the sample, wherein the detection wave evaluation unit includes a frequency analysis unit configured to perform frequency analysis on each of the double through-transmission wave and a reference wave that is the ultrasonic wave having never been transmitted through the sample and having been reflected by the ultrasonic wave reflection body, a twice-transmission coefficient calculation unit configured to calculate an actual value of a twice-transmission coefficient that is a parameter related to twice-transmission through the sample based on an intensity ratio of a spectrum of the double through-transmission wave to a spectrum of the reference wave, the spectra being obtained by the frequency analysis unit, and a twice-transmission coefficient comparison unit configured to evaluate whether the bonding layer has a weak bond by comparing the actual value of the twice-transmission coefficient calculated by the twice-transmission coefficient calculation unit with a theoretical value of the twice-transmission coefficient calculated based on a theoretical model, wherein the detection wave evaluation unit derives a parameter related to bonding at the bonding layer by changing the parameter related to bonding at the bonding layer in the theoretical model so that a peak frequency of the theoretical value of the twice-transmission coefficient matches a peak frequency of the actual value of the twice-transmission coefficient, and evaluates that the bonding layer has a weak bond when the parameter related to bonding at the bonding layer is smaller than the parameter related to bonding when a healthy bond is formed.

2. The bonding layer evaluation system according to claim 1, wherein the detection wave evaluation unit calculates a parameter related to bonding at the bonding layer.

3. A bonding layer evaluation system comprising:

an elastic wave generation device configured to generate an elastic wave from a sample including a bonding layer;

an elastic wave reflection body configured to reflect the elastic wave generated from the sample;

a sample installation unit provided between the elastic wave generation device and the elastic wave reflection body;

an elastic wave detection device disposed in a direction in which the elastic wave is reflected by the elastic wave reflection body, the elastic wave detection device being configured to detect the reflected elastic wave; and a control device configured to evaluate a parameter related to the bonding layer of the sample, wherein the control device includes an elastic wave generation control unit configured to cause the elastic wave generation device to generate the elastic wave from the sample, an elastic wave detection control unit configured to cause the elastic wave detection device to detect an actual value of the reflected elastic wave, and a detection wave evaluation unit configured to evaluate the parameter related to the bonding layer by comparing the actual value of the elastic wave detected by the elastic wave detection device caused by the elastic wave detection control unit with a theoretical value of the elastic wave calculated based on a theoretical model related to the sample, wherein the elastic wave generation device is an ultrasonic wave emission device configured to emit an ultrasonic wave to the sample, the elastic wave reflection body is an ultrasonic wave reflection body configured to reflect the ultrasonic wave, the elastic wave detection device is an ultrasonic wave detection device configured to detect the reflected ultrasonic wave, and in the control device, the elastic wave generation control unit is an ultrasonic wave emission control unit configured to cause the ultrasonic wave emission device to emit the ultrasonic wave, the elastic wave detection control unit is an ultrasonic wave detection control unit configured to cause the ultrasonic wave detection device to detect an actual value of a double through-transmission wave that is the ultrasonic wave having been once transmitted through a sample that includes a bonding layer and is installed at the sample installation unit, having been reflected by the ultrasonic wave reflection body, and having been further once transmitted through the sample, and the detection wave evaluation unit evaluates whether the bonding layer has a weak bond in evaluation of the parameter related to the bonding layer by comparing the actual value of the double through-transmission wave detected by the ultrasonic wave detection device caused by the ultrasonic wave detection control unit with a theoretical value of the double through-transmission wave calculated based on a theoretical model related to the sample, and wherein the sample includes the bonding layer and a sample piece bonded by the bonding layer, the ultrasonic wave emission device emits the ultrasonic wave to an interface of the bonding layer in a perpendicular direction, the theoretical model related to the sample is a theoretical model in which the bonding layer is connected with the sample piece through a spring interface, stiffness of a component in the perpendicular direction is set for the spring interface, and the control device calculates the theoretical value of the double through-transmission wave based on the theoretical model by using a stiffness matrix method.

4. The bonding layer evaluation system according to claim 1, wherein the sample includes the bonding layer and a sample piece bonded by the bonding layer, the ultrasonic wave emission device emits the ultrasonic wave in a tilt direction tilted relative to a perpendicular direction orthogonal to an interface of the bonding layer, the theoretical model related to the sample is a theoretical model in which the bonding layer is connected with the sample piece through a spring interface, stiffness of a component in the perpendicular direction and stiffness of a component in an in-plane direction of the interface are set for the spring interface, and the control device calculates the theoretical value of the double through-transmission wave based on the theoretical model by using a stiffness matrix method.

5. A bonding layer evaluation method comprising:

causing an elastic wave reflection body to reflect an elastic wave generated from a sample including a bonding layer and detecting an actual value of the reflected elastic wave; and evaluating a parameter related to the bonding layer by comparing the detected actual value of the elastic wave with a theoretical value of the elastic wave calculated based on a theoretical model related to the sample, wherein detecting the actual value of the elastic wave includes detecting an actual value of a double through-transmission wave that is an ultrasonic wave as an elastic wave having been twice transmitted through the sample, and evaluating the parameter related to the bonding layer includes evaluating whether the bonding layer has a weak bond by comparing the detected actual value of the double through-transmission wave with a theoretical value of the double through-transmission wave calculated based on a theoretical model related to the sample, wherein evaluating whether the bonding layer has a weak bond includes performing frequency analysis on each of the double through-transmission wave and a reference wave that is an ultrasonic wave having never been transmitted through the sample, calculating an actual value of a twice-transmission coefficient that is a parameter related to twice-transmission through the sample based on an intensity ratio of a spectrum of the double through-transmission wave to a spectrum of the reference wave, the spectra being obtained in the frequency analysis, and evaluating whether the bonding layer has a weak bond by comparing the calculated actual value of the twice-transmission coefficient with a theoretical value of the twice-transmission coefficient calculated based on a theoretical model, and wherein evaluating whether the bonding layer has a weak bond includes deriving a parameter related to bonding at the bonding layer by changing the parameter related to bonding at the bonding layer in the theoretical model so that a peak frequency of the theoretical value of the double through-transmission coefficient matches a peak frequency of the actual value of the double through-transmission coefficient, and evaluating that the bonding layer has a weak bond when the parameter related to bonding at the bonding layer is smaller than the parameter related to bonding when a healthy bond is formed.

* * * * *